May 5, 1925.
H. J. MACKEY
WEIGHING MACHINE
Filed Feb. 13, 1922
1,536,614
2 Sheets-Sheet 1
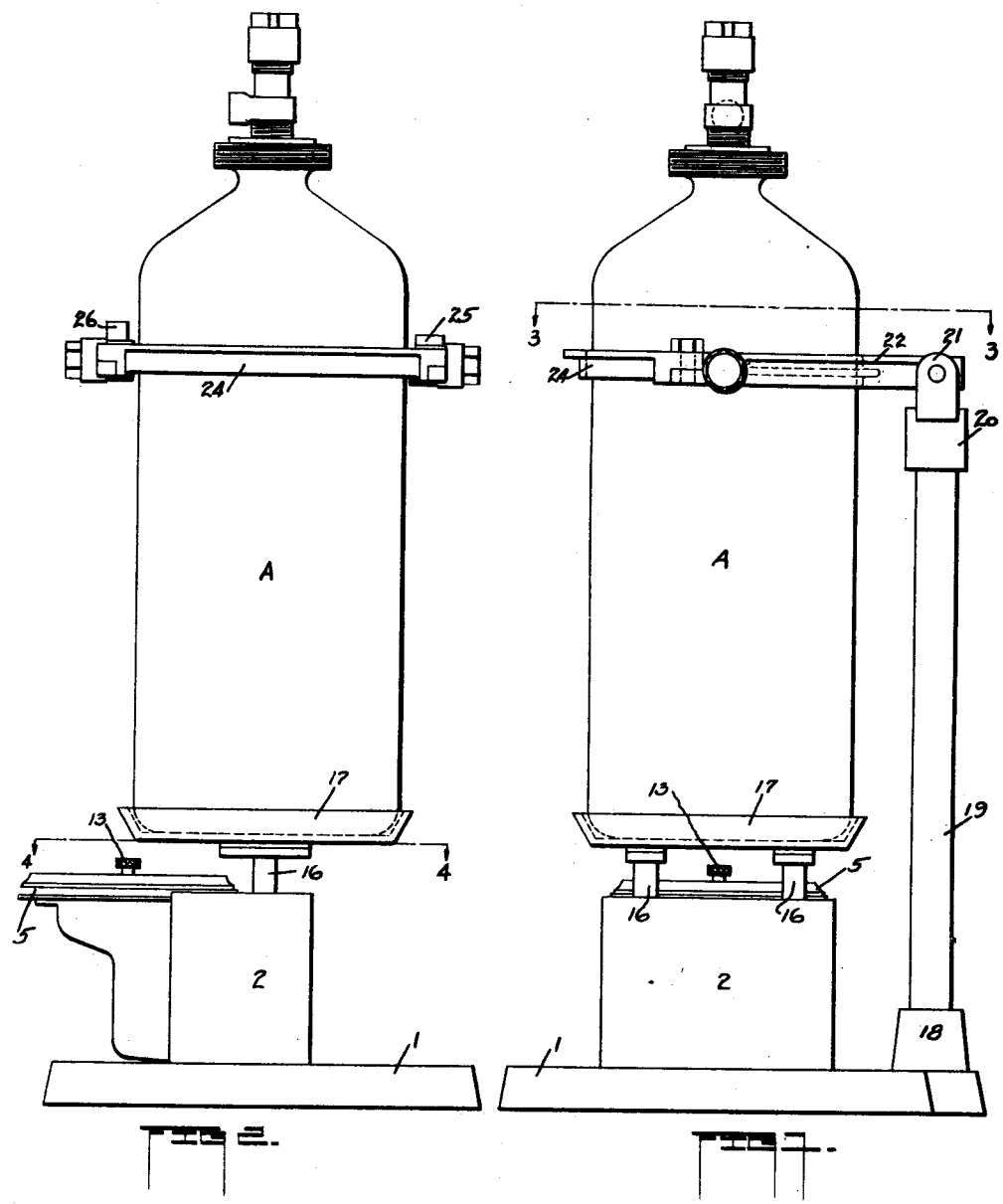
INVENTOR.
Harry J. Mackey
ATTORNEYS.

May 5, 1925.
H. J. MACKEY
WEIGHING MACHINE
Filed Feb. 13, 1922
1,536,614
2 Sheets-Sheet 2
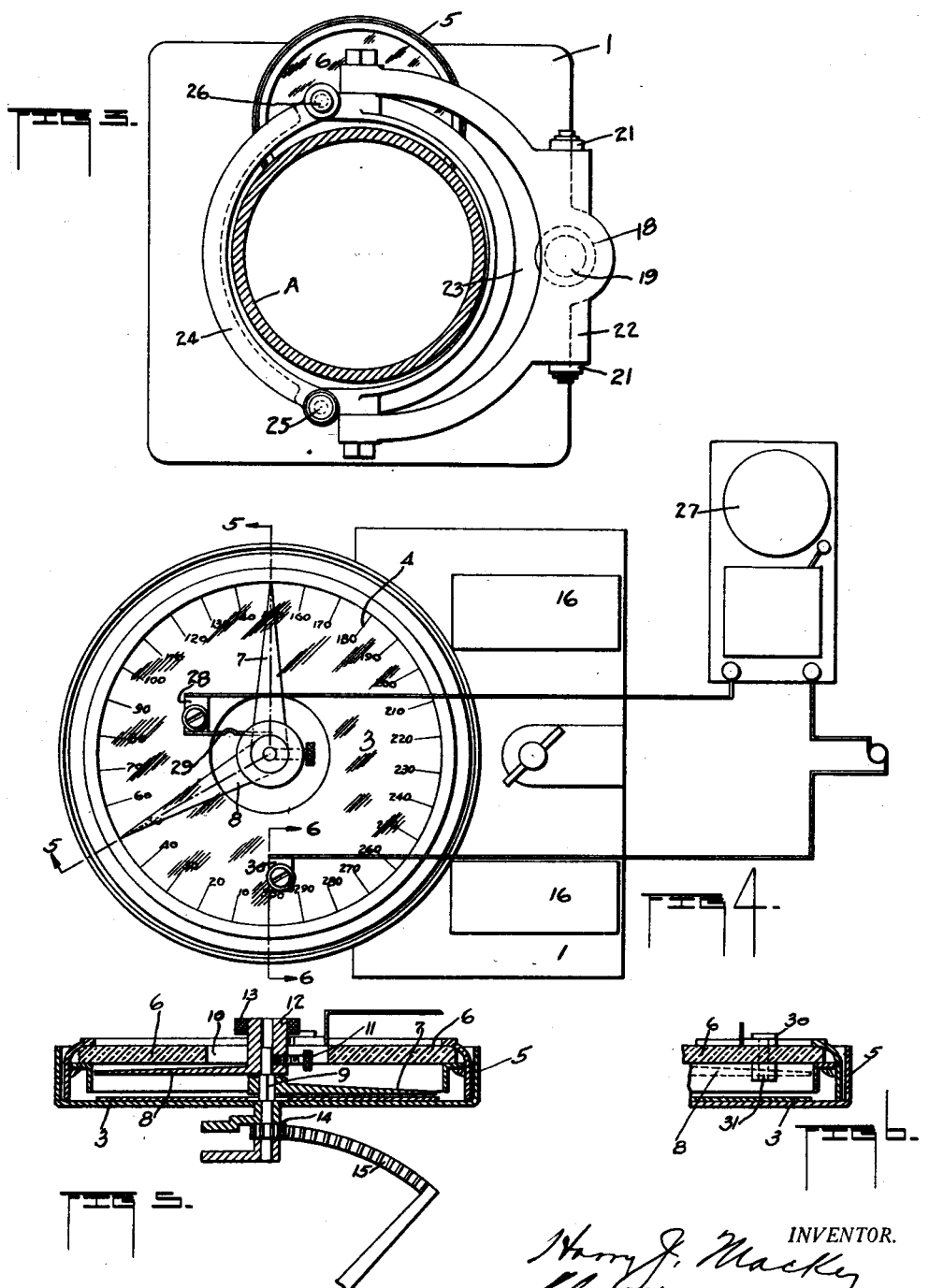
INVENTOR.
ATTORNEYS.

Patented May 5, 1925.

1,536,614

UNITED STATES PATENT OFFICE.

HARRY J. MACKEY, OF DECATUR, ILLINOIS.

WEIGHING MACHINE.

Application filed February 13, 1922. Serial No. 536,392.

*To all whom it may concern:*

Be it known that I, HARRY J. MACKEY, a citizen of the United States, a resident of Decatur, in the county of Macon and State of Illinois, have invented new and useful Improvements in Weighing Machines, of which the following is a specification.

This invention has reference to weighing machines, and it has for its principal object to provide a weighing scale which may be used to determine by weighing, the exact amount of carbonic gas received by dispensers, in drums containing the same and which will enable the user to tell under all working conditions and at all times just how many pounds of gas are in the drum.

The present invention is an improvement upon the device or apparatus shown and described in the application filed by me on October 21, 1920 bearing Serial No. 418,373. In said pending application it is stated to be one of the principal objects to provide "an attachment to hold the drum in place; such attachment coacting with the registering means, whereby the actual weight of tank and gas contents may be indicated, and by the manual manipulation of certain indicating parts, such parts may be set so as to indicate on the register the net weight of gas in the drum and the amount of gas in the drum from time to time, as it is used." In this present invention the register and registering means, with the exception of certain modifications, is not unlike that shown in my pending application referred to. The invention herein in so far as the registering means is concerned, has for its object to support the drum on the register, upon supporting means connected within the register with the movable indicating means which coacts with the dial of such register.

The present invention has for its further object to provide a new and improved base for the register and connected thereto upstanding guiding and sustaining means for the drum; said guiding means including a removable clamp to embrace the upper end of the drum and so located with relation to the registering means at the base of the drum, that a person removing or replacing a drum will not be working directly over the dial and therefore, there is little or no danger of damaging such dial.

As set forth in my pending application, carbonic gas $CO_2$ is sold to the dispensing trade in drums, at a price per pound. These drums are of different sizes and of different weight, and the weight of the drum is caused to be marked thereon. To determine the weight of the drum when containing gas, is to weigh drum and contents and subtracting the weight marked on the drum from the gross weight will give the net weight of the gas contained therein. By the use of my apparatus the purchaser may know at the time of purchase the exact and net weight of the gas in the drum and he may keep himself informed from time to time, as the gas is used just how much gas is in the drum. And he may, if he wishes, have an alarm supplied with the apparatus, adjusted to inform him when the drum is empty, or nearly so, thus giving him an opportunity of replacing the tank.

That the invention may be more fully understood, reference is had to the accompanying drawings forming a part of this description, illustrating a preferred embodiment of the invention, in which:—

Figure 1 is an elevation of the apparatus, looking at one side, with a drum supported in place;

Figure 2 is a front elevation of the apparatus, with a drum supported in place;

Figure 3 is a top plan view of the whole apparatus, a drum supported in position and in cross-section;

Figure 4 is a top plan view of the scale base and registering means, with the drum rest removed from the scale, and showing an alarm;

Figure 5 is a cross-section through the registering means, as the same would appear, if taken on the line 5—5 Figure 4, and Figure 6 is a detail sectional view, as the same would appear, if taken on the line 6—6 Figure 4.

Like characters of reference denote corresponding parts throughout the figures.

With the exception of the base, the rest for the drum, the dial and pointers or hands, the casing for the scale and the operating means of the scale within said casing are substantially similar to and counterparts of "the Detecto" scale patented July 10, 1917, and largely used by physicians, in gymnasiums and for bathrooms. Therefore, only such working parts of the scale as are necessary to show the actuating means for the pointers or hands have been illustrated in the drawings and will be detailed by description for the purpose of illustrating the operativeness of the apparatus, as no claim is made to the pointer or hand operating means.

The scale proper includes a base 1 supporting a casing or housing 2 enclosing the operating parts of the scale, only certain elements of which will be referred to, for reasons previously stated. To the left, looking at what is considered as the front of the scale, see Figure 4, is a dial 3 provided with a scale 4 thereon. This dial is mounted within and on the base of a subhousing 5 on the main housing or casing 1 and is provided with the transparent plate or closure 6 thru which may be viewed the dial and the pointers or hands 7 and 8, the former preferably secured to an arbor or spindle 9 projecting up thru the base of the housing 5 and into an opening 10 in the center of the plate 6; the pointer or hand 8 arranged for manual adjustment on the upper end of said arbor or spindle 9 and adapted to be secured in different adjusted positions by a set screw 11, which an operator may reach thru the opening 10 in said plate 6, said pointer or hand 8 being provided with an elongated hub 12 to the upper and exposed end of which is connected an insulated ring 13, for manual manipulation of said pointer or hand, as will be understood. On the lower end of said arbor or spindle 9 is secured a small gear wheel 14 meshing with a rack 15 operatively connected, and in a manner not shown, with the vertically movable members 16, 16 to which are connected the drum rest 17, preferably saucer or pan shaped to receive the lower end of a drum A, which upstands therefrom, as shown in Figures 1 and 2. This drum is of that type commonly used for containing carbonic gas, well known to the soda dispensing trade and like places, and the tare weight of such drum is usually marked on the neck of the drum or other convenient place. For example, I have assumed that the tare weight of the drum illustrated is "100" pounds.

The rear of the base 1 is provided with an upstanded boss or lug 18, see Figures 1 and 3 having a socket to receive the lower end of an upright or pipe 19 to the upper end of which is connected a bracket 20 having spaced ears 21 to which and between which is pivoted a yoke 22, and to said yoke is connected a clamp comprising the semicircular ring-like sections 23 and 24 which are adapted to loosely embrace the upper end of the drum A, as shown in Figure 3. Said sections 23 and 24 are hinged together at 25 and are detachably connected by a clamp pin 26. Removing the pin 26 permits the section 24 to swing away from the drum A on the pivot 25 so as to allow the drum to be removed and another replaced, as desired. The clamp loosely embraces the upper end of the drum A, as stated, so as to permit the drum to slide up and down freely. The clamp also does not interfere with the working of the scale and in no way adds to the direct load on the scale, as is apparent. It is also apparent, that by locating the scale to the left side of the drum, when the latter is in position, the operator will not be working directly over the dial thereof when opening or closing the clamp during the removal or replacing a drum and that therefore there is little or no danger of damaging such dial. The scale 4 on the dial 3 has markings thereon similar to those disclosed in my pending application, except that such markings are designated by numerals "10" to "300" respectively.

For purposes of explanation, we will assume that a dispenser of soda water takes in a drum marked "100" pounds and alleged to contain "50" pounds of carbonic gas, the total weight of drum and gas alleged to be "150" pounds. Having one of the machines, herein illustrated, in the basement of his establishment the drum is placed in position and clamped, as shown in Figures 1 and 2. The weight of drum and contents will cause the arbor or spindle 9 to rotate, moving the pointer or hand 7 opposite the numeral "150" on the scale indicating that the gross weight of drum and gas content is "150" pounds. By this means the dispenser may know definitely whether or not the alleged weight of drum and gas content is correct. That the dispenser may be kept informed from time to time just how much gas is in the drum, he will release the set screw 11 and turn the pointer or hand 8 on the arbor or spindle 9 opposite the numeral "50" on the scale 4, which is the difference between the tare weight (100 lbs.) of the drum and the total weight. In other words, the tare weight (100 lbs.) of the drum is subtracted from the total weight (150 lbs.) showing that there is "50" pounds of gas in the drum. The set screw 11 is then set, so that as the gas is used, and the drum becomes lighter, movement is imparted to the rock bar 15 to impart rotational movement to the gear wheel 14 and the arbor or spindle 9. Such movement is in turn imparted to the pointers or hands 7 and 8, and the latter as it moves across the face of the dial will show just how much gas is in the drum, as it is used.

Without some signalling device or alarm to indicate when the gas is about used up, the scale should be installed near where the party or parties using the gas may watch the dial from time to time. However, I prefer that the scale, which would ordinarily be located in the basement, be connected with some suitable alarm or signalling device to notify the user when the gas is about used up. Such a signalling device could include an alarm bell 27 located at the soda fountain, or other convenient or suitable place, and said bell wired to the apparatus. One wire connected to a binding post 28 on the transparent plate 6 from which a contact plate 29 leads to the hub of the pointer or hand 8, and the other wire connected to a binding post 30 also on the plate 6, which is provided with a contact member 31, see Figure 6 with which the pointer or hand 8 will come into contact as it moves backward to the end of the scale. The location of the post 30 and the contact member 31 it is understood is purely optional, and may be located at any point on the dial desired. Also, that while I have elected to illustrate a drum weighing "100" lbs. it is understood this is merely for example or illustrative purposes, and that the device may be constructed to handle drums of different sizes and different weights.

What I claim is:—

1. In a weighing device of the character described, in combination, a base, a scale thereon, means coacting with the scale and forming a rest for a drum, a standard upstanding from said base to one side of said drum rest, and guiding means extending laterally from the upper end of said standard and above said drum rest and arranged to loosely embrace the upper end of the drum.

2. In a weighing device of the character described, in combination, a base, a scale thereon, a rest for a drum, means connecting the rest with the scale operating means, a socket formed lug upstanding on said base, a standard connected with said socket formed lug, and guiding means connected with said standard and arranged to loosely embrace the drum.

3. In a weighing device of the character described, in combination, a base, a vertically movable drum rest on said base, a scale dial connected with said base and located below the plane of said rest and off-set therefrom, a lug connected with said base, a vertically disposed standard connected with said lug, and guiding means connected with said standard and arranged to loosely embrace the upper end of the drum.

4. In a weighing device of the character described, in combination, a base, a vertically movable drum rest on said base, a scale dial connected with said base and located below the plane of said rest and off-set therefrom, a lug connected with said base, a vertically disposed standard connected with said lug, a yoke pivotally connected with the upper end of said standard, and a clamp connected with said yoke and arranged to loosely embrace said drum, said guiding means comprising complementary pivoted members.

5. In a weighing device of the character described, in combination, a base, a dial housing connected therewith, a transparent plate for said housing having a central opening therein, an arbor journaled in said housing, pointers connected with said arbor, means for adjusting one of said pointers, such means located within the opening in said plate, a drum rest on said base, and means connected with the base to loosely embrace a drum.

In witness whereof, I have hereunto affixed my hand this 25th day of January, 1922.

HARRY J. MACKEY.